US012229245B2

(12) United States Patent
Davidovich et al.

(10) Patent No.: US 12,229,245 B2
(45) Date of Patent: Feb. 18, 2025

(54) CONTROL FLOW INTEGRITY SYSTEM AND METHOD

(71) Applicant: C2A-SEC, LTD., Jerusalem (IL)

(72) Inventors: Yitzhack Davidovich, Jerusalem (IL); Yoav Fuchs, Har Gilo (IL); Leonid Frenkel, Kfar Aza (IL)

(73) Assignee: C2A-SEC, LTD, Jersalem (IL)

(*) Notice: Subject to any disclaimer, the term of this patent is extended or adjusted under 35 U.S.C. 154(b) by 264 days.

(21) Appl. No.: 17/795,535

(22) PCT Filed: Jan. 27, 2021

(86) PCT No.: PCT/IL2021/050090
§ 371 (c)(1),
(2) Date: Jul. 27, 2022

(87) PCT Pub. No.: WO2021/152583
PCT Pub. Date: Aug. 5, 2021

(65) Prior Publication Data
US 2023/0049233 A1 Feb. 16, 2023

Related U.S. Application Data

(60) Provisional application No. 62/966,573, filed on Jan. 28, 2020.

(51) Int. Cl.
*G06F 21/52* (2013.01)
(52) U.S. Cl.
CPC ........ *G06F 21/52* (2013.01); *G06F 2221/034* (2013.01)
(58) Field of Classification Search
CPC .............................. G06F 21/52; G06F 221/34
See application file for complete search history.

(56) References Cited

U.S. PATENT DOCUMENTS

2012/0030731 A1* 2/2012 Bhargava ............... H04L 63/10
726/3
2013/0276056 A1* 10/2013 Epstein ................. G06F 21/604
726/1

(Continued)

FOREIGN PATENT DOCUMENTS

EP       3608805 A1 *  2/2020
WO    2020012474 A1     1/2020

OTHER PUBLICATIONS

Davi et al., (2012) MoCFI: A Framework to Mitigate Control-Flow Attacks on Smartphones. Proceedings of the 19th Network and Distributed System Security Symposium (2012), The Internet Society, San Diego, California, Feb. 7, 2012 (Feb. 7, 2012), pp. 1-17. Retrieved from the Internet: URL:https://www.internetsociety.org/sites/default/files/07_2.pdf [retrieved on May 12, 2017].

(Continued)

*Primary Examiner* — Darshan I Dhruv
(74) *Attorney, Agent, or Firm* — Webb and Co. Ltd

(57) ABSTRACT

A CFI system constituted of: at least one protection module, each comprising a respective allowable flow model associated with at least one of a plurality of portions of a process; and at least one process protection manager, arranged, responsive to a control flow instruction in one of the plurality of portions of the process, to: compare one or more parameters of the control flow instruction to the allowable flow model of the associated protection module; and responsive to an outcome of the comparison indicating that the compared parameters do not meet a respective parameter of the allowable flow model, generate a predetermined signal, wherein each protection module is implemented as a shared object, wherein each process protection manager is implemented as a shared object, and wherein the at least one (Continued)

protection module and the process protection manager are loaded into the process.

20 Claims, 7 Drawing Sheets

(56) References Cited

U.S. PATENT DOCUMENTS

| | | | | |
|---|---|---|---|---|
| 2013/0283245 | A1* | 10/2013 | Black | G06F 9/44589 |
| | | | | 717/130 |
| 2015/0135313 | A1* | 5/2015 | Wesie | G06F 21/51 |
| | | | | 726/22 |
| 2015/0199283 | A1* | 7/2015 | Epstein | G06F 12/145 |
| | | | | 711/152 |
| 2015/0278491 | A1* | 10/2015 | Horning | G06F 21/10 |
| | | | | 726/26 |
| 2016/0357958 | A1 | 12/2016 | Guidry | |
| 2017/0024562 | A1 | 1/2017 | Rombouts | |
| 2017/0116410 | A1* | 4/2017 | Wajs | G06F 8/70 |
| 2018/0101565 | A1 | 4/2018 | Pike | |
| 2018/0351968 | A1* | 12/2018 | MacLeod | G06F 21/568 |
| 2019/0102567 | A1* | 4/2019 | Lemay | G06F 21/78 |
| 2019/0138725 | A1* | 5/2019 | Gupta | G06F 9/485 |
| 2019/0163900 | A1* | 5/2019 | Zhang | G06N 20/00 |
| 2019/0286551 | A1* | 9/2019 | Volckaert | G06F 21/52 |
| 2019/0354679 | A1* | 11/2019 | Krten | G06F 21/54 |
| 2020/0117803 | A1* | 4/2020 | Hamlen | G06F 3/1222 |
| 2021/0406137 | A1* | 12/2021 | Sutherland | G06F 9/4498 |
| 2022/0050904 | A1* | 2/2022 | Sullivan | G06F 21/121 |

OTHER PUBLICATIONS

Niu and Tan (2014) Modular control-flow integrity. PLDI '09: Proceedings of the 2009 ACM SIGPLAN Conference on Programming Language Design and Implementation. Jun. 15-20, 2009, Dublin, Ireland. ACM SIGPLAN Notices 49(6): 577-587. DOI: 10.1145/2666356.2594295.

* cited by examiner

| 1000 | TRANSMIT ONE OR MORE FILES TO SERVER, OPT. ELF FILE AND/OR SO FILES |
|---|---|
| 1010 | GENERATE PROTECTION MODULE FOR EACH FILE, EACH MODULE COMPRISING AN ALLOWABLE FLOW MODEL |
| 1020 | GENERATE ALLOWABLE FLOW MODEL, OPT. BY SCANNING FILE TO DETERMINE LEGITIMATE CALL STACKS; RETURN ADDRESSES AND REGISTERS |
| 1030 | REPLACE OPCODES WITH INSTRUNCTIONS TO ENTER PROTECTION MODULE, AND STORE OPCODE INFORMATION IN PROTECTION MODULE |
| 1035 | (OPT.) INSERT INDICATION OF PATCH WITHIN FILE HEADER |
| 1040 | GENERATE AT LEAST ONE PROCESS PROTECTION MANAGER, OPT. EACH PROTECTION MODULE COMPRISES BRANCH TO PROCESS PROTECTION MANAGER |
| 1045 | (OPT.) ADD DEPENDENCY TO ELF FILE FOR PROCESS PROTECTION MANAGER |
| 1050 | OUTPUT ADJUSTED ONE OR MORE FILES |

FIG. 1B

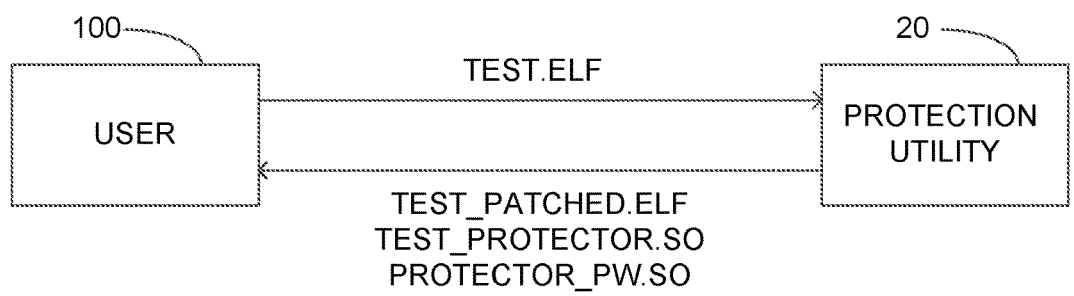

FIG. 1C

2000 — LOAD PROCESS PROTECTION MANAGER SHARED OBJECT INTO PROCESS, OPT. AS LD_PRELOAD, OPT. SELECT MANAGER FROM PLURALITY OF MANAGERS, EACH WITH RESPECTIVE COMPARISON RULE AND/OR RESPECTIVE SIGNAL GENERATION, RESPONSIVE TO FEATURE OF PROCESS

2010 — LOAD PROTECTION MODULE SHARED OBJECTS INTO PROCESS, OPT. WITH DLOPEN, OPT. ONLY FOR FILES EXHIBITING PREDETERMINED INDICATION

2020 — RESPONSIVE TO CONTROL FLOW INSTRUCTION IN PORTION OF PROCESS, COMPARE PARAMETERS OF INSTRUCTION TO ALLOWABLE FLOW MODEL OF RESPECTIVE PROTECTION MODULE, OPT. COMPARISON RESPONSIVE TO CONTROL FLOW INSTRUCTION IN PROTECTION MODULE

2030 — (OPT.) IF CONTROL FLOW INSTRUCTION IN FIRST PORTION OF PROCESS COMPRISES BRANCH OR CALL TO SECOND PORTION, COMPARISON IN ACCORDANCE WITH ALLOWABLE FLOW MODEL OF PROTECTION MODULE ASSOCIATED WITH SECOND PORTION, OPT. RESPONSIVE TO FIRST PORTION FLOW MODEL NOT CONTAINING RESPECTIVE PARAMETER, COMPARE WITH SECOND PORTION FLOW MODEL

2040 — RESPONSIVE TO OUTCOME OF COMPARISON INDICATIVE THAT INSTRUCTION PARAMETERS DON'T MEET ALLOWABLE FLOW MODEL, GENERATE SIGNAL, OPT. REPORT, OPT. PREVENT OPERATION OF INSTRUCTION

FIG. 2C

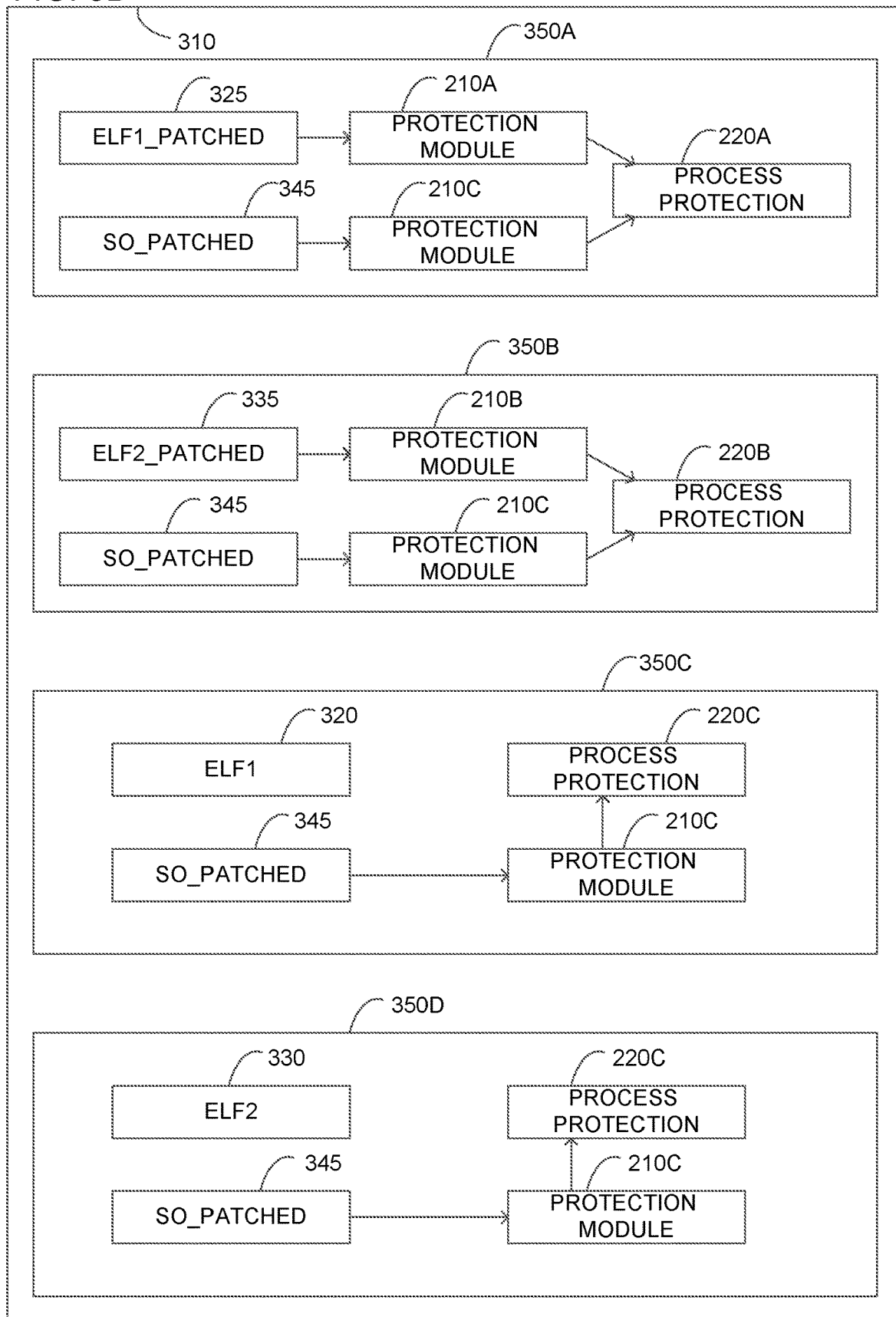

CONTROL FLOW INTEGRITY SYSTEM AND METHOD

CROSS-REFERENCE TO RELATED APPLICATIONS

The present application claims priority from U.S. provisional application Ser. 62/966,573, filed Jan. 28, 2020, and entitled "CONTROL FLOW INTEGRITY SYSTEM AND METHOD", the entire contents of which incorporated herein by reference.

TECHNICAL FIELD

The invention relates generally to the field of control flow integrity security devices, and more specifically to a control flow integrity system and method for control flow integrity in one or more processes.

BACKGROUND

In computing, a linker or link editor is a computer utility program that takes one or more object files generated by a compiler or an assembler and combines them into a single executable file, library file, or another 'object' file. Common linking methods are static and dynamic linking. Static linking is the result of the linker copying all library routines used in the program into the executable file. This may require more disk space and memory than dynamic linking, but is more portable, since it does not require the presence of the library on the system where it runs.

Many operating system environments allow dynamic linking, thereby deferring the resolution of some undefined symbols until a program is run. This means that the executable code still contains undefined symbols, plus a list of objects or libraries that will provide definitions for these undefined symbols. Loading the program will load these objects/libraries as well, and perform a final linking. Executable Linkable Format (ELF) files are files which consist of a symbol look-up and relocatable table, i.e. it can be loaded at any memory address by the kernel and automatically all symbols used are adjusted to the offset from that memory address where it was loaded into. One of the ways to protect an ELF file from runtime vulnerability exploitation, is to add a control-flow integrity (CFI) check. CFI is a general term for computer security techniques which prevent a wide variety of malware attacks from redirecting the flow of execution of a program. There are different methods to add CFI checks to a binary file.

For a statically linked executable file, all the code is added to the executable file before execution. Therefore, in this case the CFI is added to the executable file. The final linking is done before running the ELF file, therefore the CFI can be added to the ELF file before run time. For a dynamically linked executable file, the final linking happens on runtime by the loader. Therefore, the CFI check can be added after the shared object is added to the process's memory.

In the automotive market there is a demand to add CFI checks to electrical control units (ECUs), domain controller units (DCUs) and other end points, such as telematics control units (TCUs). There are 4 main unique area for CFI in the automotive market:

1. Zero false positive—the CFI check should be 100% deterministic, and not mistakenly generate an alert;
2. Real time performance—the CFI check should not add a latency greater than a few microseconds to the flow;
3. High security—the CFI check should be hard to circumvent; and
4. Ease of maintenance—the CFI check should be easily updatable since it's hard to update an ECU in the vehicle.

Most CFI solutions that exist in the market today are designed to protect industrial/organization computers, internet of things (IOT) devices, etc. Therefore, they don't meet the zero false positive standard.

In addition, it is common to find in the market CFI solutions that are based on cryptography, writing cookies/magic values, etc. These methods are not performed in real time. Additionally, in methods based on writing a cookie to the memory, the memory of this cookie must be writable, thereby allowing an attacker to write to this area and manipulate the cookie.

SUMMARY OF THE DISCLOSURE

Accordingly, it is a principal object of the present invention to overcome at least some of the disadvantages of prior art CFI methods and arrangements. This is provided in one embodiment by a CFI system comprising: at least one protection module, each of the at least one protection module comprising a respective allowable flow model associated with at least one of a plurality of portions of a process; and at least one process protection manager, a respective one of the at least one process protection manager arranged, responsive to a control flow instruction in one of the plurality of portions of the process, to: compare one or more parameters of the control flow instruction to the allowable flow model of the associated protection module; and responsive to an outcome of the comparison indicating that the compared one or more parameters does not meet a respective parameter of the respective allowable flow model, generate a predetermined signal, wherein each of the at least one protection module is implemented as a shared object, wherein each of the at least one process protection manager is implemented as a shared object, and wherein the at least one protection module and the process protection manager are loaded into the process.

In one embodiment, the parameter comparison and signal generation of the respective process protection manager is responsive to a control flow instruction associated with the respective protection module. In one further embodiment, the control flow instruction associated with the respective protection module comprises a predetermined branch instruction to the process protection manager. In another further embodiment, the parameter comparison and signal generation of the at least one process protection manager is further responsive to information sent to the respective process protection manager responsive to the control flow instruction associated with the respective protection module.

In one embodiment, a control flow instruction in a first of the plurality of portions of the process comprises a branch or call to an address associated with a second of the plurality of portions of the process, the comparison being with the allowable flow model of the protection module associated with the second portion of the process. In another embodiment, the at least one protection module comprises a plurality of protection modules, wherein, responsive to the associated flow model not containing the respective parameter, the respective process protection manager is further arranged to: compare one or more parameters of the control flow instruction to an allowable flow model of another of the plurality of protection modules; and responsive to an outcome of the comparison indicating that the compared one or more parameters does not meet a respective parameter of the respective allowable flow model, generate a predetermined signal.

In one embodiment, each of the plurality portions of the process is associated with a respective one of a plurality of files, wherein responsive to a first of the plurality of files exhibiting a predetermined indication, the respective process protection manager loads the respective protection model shared object associated with the first file, and wherein responsive to a second of the plurality of files not exhibiting the predetermined indication, the respective process protection manager does not load the respective protection model shared object associated with the second file. In another embodiment, the at least one process protection manager comprises a plurality of process protection managers, each exhibiting a respective predetermined rule, the comparison responsive to the respective predetermined rule of the respective process protection manager, and wherein the respective one of the plurality of process protection managers is selected responsive to a predetermined feature of the process.

In one embodiment, the at least one process protection manager comprises a plurality of process protection managers, wherein the generated signal of a first of the plurality of process protection managers is arranged to prevent the operation of the respective control flow instruction and the generated signal of a second of the plurality of process protection managers is not arranged to prevent the operation of the respective control flow instruction, and wherein the respective one of the plurality of process protection managers is selected responsive to a predetermined feature of the process. In another embodiment, a first of the plurality of portions of the process is associated with an executable file and a second of the plurality of portions of the process is associated with a shared object file.

In one embodiment, the respective process protection manager is loaded into a plurality of processes. In another embodiment, each of the at least protection module exhibits an indication of which of the parameters are used in the respective comparison.

In one independent embodiment, a control flow integrity system comprising a processor and a memory, the processor arranged, responsive to instructions stored in the memory, to load into a process: at least one protection module; and a process protection manager, wherein the loaded process protection manager is arranged to: compare one or more parameters of the control flow instruction to the allowable flow model of the associated protection module; and responsive to an outcome of the comparison indicating that the compared one or more parameters does not meet a respective parameter of the respective allowable flow model, generate a predetermined signal, wherein each of the at least one protection module is implemented as a shared object, and wherein each of the at least one process protection manager is implemented as a shared object.

In one embodiment, the parameter comparison and signal generation of the loaded process protection manager is responsive to a control flow instruction associated with the respective protection module. In one further embodiment, the control flow instruction associated with the respective protection module comprises a predetermined branch instruction to the process protection manager. In another further embodiment, the parameter comparison and signal generation of the loaded process protection manager is further responsive to information sent to the loaded process protection manager responsive to the control flow instruction associated with the respective protection module.

In one embodiment, a control flow instruction in a first of the plurality of portions of the process comprises a branch or call to an address associated with a second of the plurality of portions of the process, the comparison being with the allowable flow model of the protection module associated with the second portion of the process. In another embodiment, the at least one protection module comprises a plurality of protection modules, wherein, responsive to the associated flow model not containing the respective parameter, the process protection manager is further arranged to: compare one or more parameters of the control flow instruction to an allowable flow model of another of the plurality of protection modules; and responsive to an outcome of the comparison indicating that the compared one or more parameters does not meet a respective parameter of the respective allowable flow model, generate a predetermined signal.

In one embodiment, each of the plurality portions of the process is associated with a respective one of a plurality of files, wherein responsive to a first of the plurality of files exhibiting a predetermined indication, the process protection manager loads the respective protection model shared object associated with the first file, and wherein responsive to a second of the plurality of files not exhibiting the predetermined indication, the process protection manager does not load the respective protection model shared object associated with the second file. In another embodiment, the process protection manager is one of a plurality of process protection managers, each exhibiting a respective predetermined rule, the comparison responsive to the respective predetermined rule of the respective process protection manager, and wherein the respective one of the plurality of process protection managers is selected responsive to a predetermined feature of the process.

In one embodiment, the process protection manager is one of a plurality of process protection managers, wherein the generated signal of a first of the plurality of process protection managers is arranged to prevent the operation of the respective control flow instruction and the generated signal of a second of the plurality of process protection managers is not arranged to prevent the operation of the respective control flow instruction, and wherein the respective one of the plurality of process protection managers is selected responsive to a predetermined feature of the process. In another embodiment, a first of the plurality of portions of the process is associated with an executable file and a second of the plurality of portions of the process is associated with a shared object file.

In one embodiment, the process protection manager is loaded into a plurality of processes. In another embodiment, each of the at least protection module exhibits an indication of which of the parameters are used in the respective comparison.

In another independent embodiment, a control flow integrity method is provided, the method comprising: loading at least one protection module into a process; and loading a process protection manager into the process, wherein the loaded process protection manager is arranged to: compare one or more parameters of the control flow instruction to the allowable flow model of the associated protection module; and responsive to an outcome of the comparison indicating that the compared one or more parameters does not meet a respective parameter of the respective allowable flow model, generate a predetermined signal, wherein each of the at least one protection module is implemented as a shared object, and wherein each of the at least one process protection manager is implemented as a shared object.

In one embodiment, the parameter comparison and signal generation of the loaded process protection manager is responsive to a control flow instruction associated with the respective protection module. In one further embodiment, the control flow instruction associated with the respective protection module comprises a predetermined branch instruction to the process protection manager. In another further embodiment, the parameter comparison and signal generation of the loaded process protection manager is further responsive to information sent to the loaded process protection manager responsive to the control flow instruction associated with the respective protection module.

In one embodiment, a control flow instruction in a first of the plurality of portions of the process comprises a branch or call to an address associated with a second of the plurality of portions of the process, the comparison being with the allowable flow model of the protection module associated with the second portion of the process. In another embodiment, the at least one protection module comprises a plurality of protection modules, and wherein, responsive to the associated flow model not containing the respective parameter, the process protection manager is further arranged to: compare one or more parameters of the control flow instruction to an allowable flow model of another of the plurality of protection modules; and responsive to an outcome of the comparison indicating that the compared one or more parameters does not meet a respective parameter of the respective allowable flow model, generate a predetermined signal In one embodiment, each of the plurality portions of the process is associated with a respective one of a plurality of files, wherein responsive to a first of the plurality of files exhibiting a predetermined indication, the process protection manager loads the respective protection model shared object associated with the first file, and wherein responsive to a second of the plurality of files not exhibiting the predetermined indication, the process protection manager does not load the respective protection model shared object associated with the second file. In another embodiment, wherein the process protection manager is one of a plurality of process protection managers, each exhibiting a respective predetermined rule, the comparison responsive to the respective predetermined rule of the respective process protection manager, and wherein the respective one of the plurality of process protection managers is selected responsive to a predetermined feature of the process.

In one embodiment, the process protection manager is one of a plurality of process protection managers, wherein the generated signal of a first of the plurality of process protection managers is arranged to prevent the operation of the respective control flow instruction and the generated signal of a second of the plurality of process protection managers is not arranged to prevent the operation of the respective control flow instruction, and wherein the respective one of the plurality of process protection managers is selected responsive to a predetermined feature of the process. In another embodiment, a first of the plurality of portions of the process is associated with an executable file and a second of the plurality of portions of the process is associated with a shared object file.

In one embodiment, the method further comprises loading the process protection manager into a plurality of processes. In another embodiment, each of the at least protection module exhibits an indication of which of the parameters are used in the respective comparison.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings:

FIG. 1B illustrates a high level flow chart of a CFI protection shared object generation method, in accordance with certain embodiments;

FIGS. 1C-1E illustrate various flow diagrams of different examples of implementation of the method of FIG. 1B;

FIG. 2C illustrates a high level flow chart of a method of operation of the CFI system of FIG. 2A, in accordance with certain embodiments; and FIGS. 3A-3B illustrate an example of the use of the CFI system of FIG. 2A.

DETAILED DESCRIPTION OF THE PREFERRED EMBODIMENTS

Figure 1A:
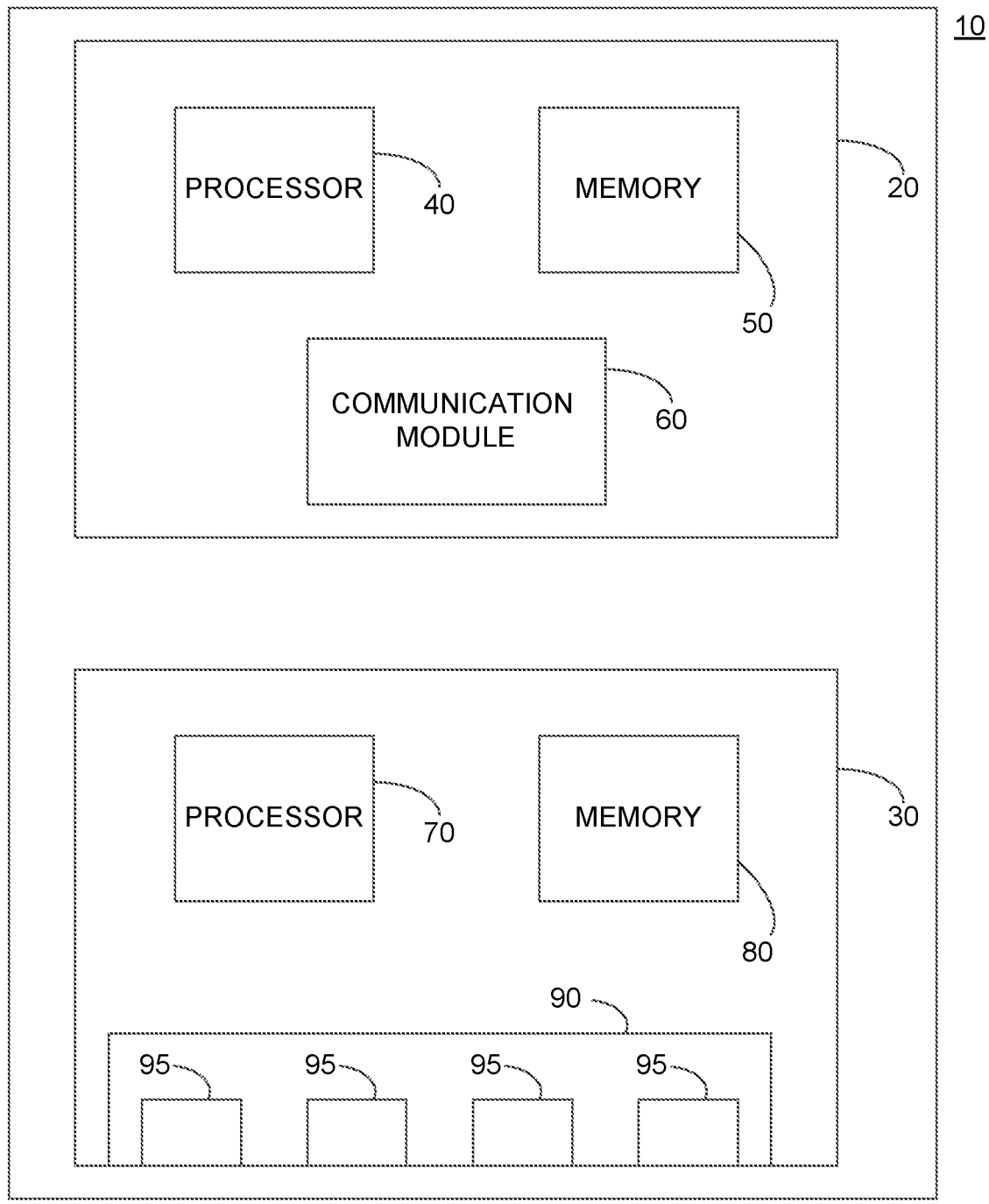
FIG. 1A illustrates a high level block diagram of a CFI protection shared object generation system, in accordance with certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1A illustrates a high level block diagram of a CFI protection shared object generation system 10. CFI protection shared object generation system 10 comprises: a server 20; and a run time unit 30. Run time unit 30 is any system which runs using a call stack, such as, but not limited to, an electronic control unit of a vehicle. Server 20 comprises: a processor 40; a memory 50; and a communication node 60. In one embodiment, communication node 60 comprises an internet input/output port, as known to those skilled in the art. Run time unit 30 comprises: a processor 70; a memory 80; and a communication node 90 comprising one or more entry point and input handler pairs 95. Each entry point 95 is a hardware module which can be connected to an external device, such as an Ethernet interface, a controller area network (CAN) controller/transceiver or a bluetooth device, without limitation. For each entry point 95, an input handler is provided, i.e. a software module which handles communication for the respective hardware entry point, such as a CAN driver or an Ethernet driver, without limitation.

FIG. 1B illustrates a high level flow chart of a CFI protection shared object generation method, in accordance with certain embodiments. The CFI protection shared object generation method is described in relation to CFI protection shared object generation system 10 of FIG. 1A, however this is not meant to be limiting in any way and the method can be performed by a different appropriate system, without exceeding the scope.

Figure 1D:
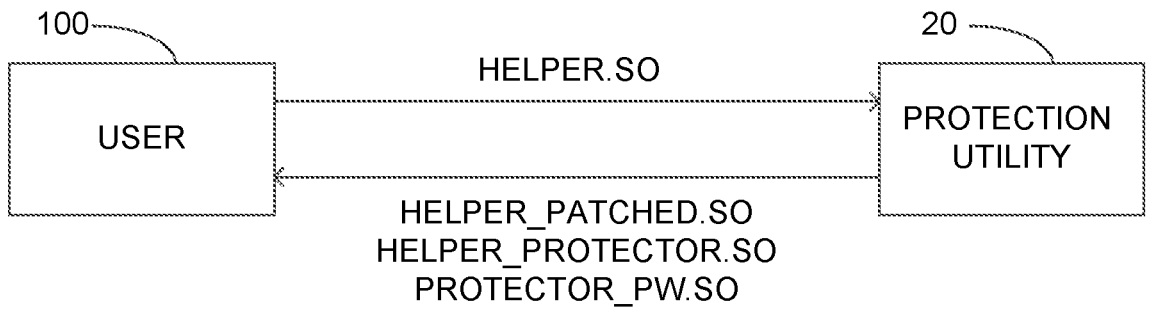
Figure 1E:
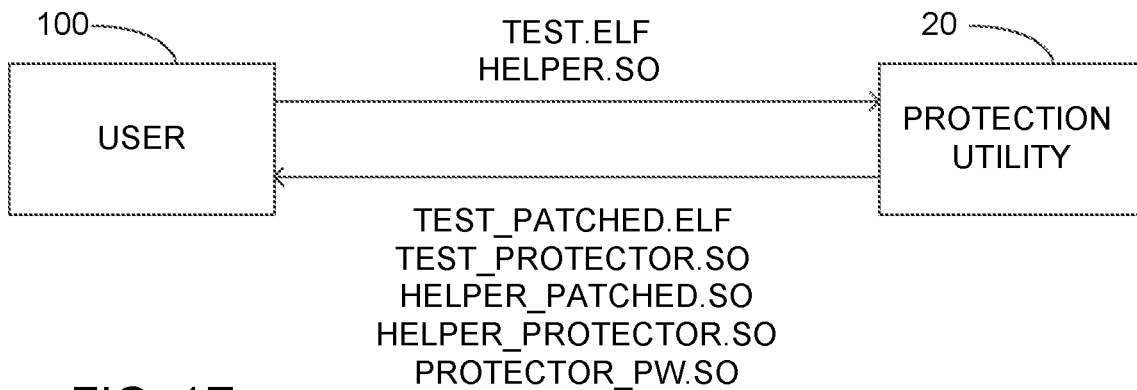

In stage 1000, as illustrated in FIGS. 1C-1E, one or more files are transmitted to server 20 from a user terminal 100. In one embodiment, user terminal 100 comprises run time unit 30. In another embodiment, user terminal 100 is in communication with run time unit 30. In another embodiment, user terminal 100 is in communication with a separate server (not shown) that is in communication with a plurality of run time units 30, the communication with the plurality of run time units 30 optionally being temporary connections for purposes of updating software. In one embodiment, as illustrated in FIG. 1C, an ELF file is transmitted to server 20. In another embodiment, as illustrated in FIG. 1D, a shared object file is transmitted to server 20. In another embodiment, both an ELF file and a shared object file are transmitted to server 20. Although FIGS. 1C-1E are illustrated responsive to embodiments incorporating a single ELF and/or shared object file, this is not meant to be limiting in any way. In another embodiment, a plurality of ELF files and/or a plurality of shared object files are transmitted to server 20. In one embodiment, each of the received ELF files is a binary program image.

In stage 1010, processor 40 of server 20 generates, responsive to instructions stored on memory 50, a protection module for each of the received files. Each protection module is implemented as a shared object, i.e. a library that is compiled such that it can be shared by a plurality of applications, as known to those skilled in the art. In one exemplary embodiment, the source code of each protection module is compiled using a GNU Compiler Collection (GCC) compiler with the -share flag. As will be described below, each protection module is loaded into a process in run time. In one embodiment, a respective protection module is generated for each received ELF file. In another embodiment, a respective protection module is generated for a plurality of received ELF files. In one embodiment, a respective protection module is generated for each received shared object file. In another embodiment, a respective protection module is generated for a plurality of received shared object files. Each generated protection module comprises an allowable flow model for the respective associated ELF or shared object file. In one embodiment, the allowable flow model is a model of deterministic allowed flows. The term "deterministic allowed flow" is meant as a flow with 100% certainty of allowed parameters in the flow. For example, if there isn't 100% certainty of an allowed return address from a particular function, the function is marked as non-deterministic.

In one embodiment, the allowable flow models are generated as described in PCT patent application publication WO 2020/012,474, published Jan. 16, 2020, the entire contents of which are incorporated herein by reference. Particularly, the respective allowable flow model comprises one or more parameters for verifying the flow of the process. For example, the flow of a process can be jumping to a procedure and returning from a procedure. Thus, the flow will be verified when jumping to the procedure and when returning from the procedure. In one embodiment, the respective allowable flow model comprises information regarding: legitimate call stacks allowed to jump to each of a plurality of addresses; legitimate return addresses; and legitimate registers to be used in association with respective opcodes in the associated received file. In one further embodiment, the respective allowable flow model further comprises information regarding legitimate buffer sizes for respective calls in the associated received file. In another further embodiment, the respective allowable flow model further comprises legitimate flows for calling each of a plurality of functions. Specifically, a legitimate flow for calling a function is an allowable sequential chain of functions, where each function is allowed to call the next function in the chain.

In stage 1020, in one embodiment each allowable flow model is generated by a first preparation script that scans the code of the respective file to determine: legitimate call stacks which are allowed to jump to each address; legitimate return addresses; and legitimate registers to be used. As described above, in one embodiment the first preparation script further scans the code of the respective file to determine the allowed buffer sizes for each function call. In another embodiment, the first preparation script further scans the code of the respective file to determine legitimate flows for calling each of a plurality of functions. The respective allowable flow protection model thus indicates legitimate values of the respective parameters. In one embodiment, the scanned code used for generating the allowable flow model is only code that is associated with system entry points of one or more input handlers 95 of communication module 90 of run time unit 30.

In stage 1030, processor 40 replaces at least one opcode of the respective received file with a predetermined instruction which will enter the respective generated protection module. In one embodiment, the first preparation script described above determines a call tree for the one or more input handlers 95 and each opcode within the respective determined call tree is replaced with a respective predetermined instruction. The predetermined instruction can be a call to the protection functionality, a branch to the protection functionality, or a jump to the protection functionality, in accordance with the relevant architecture. For example, in an ARM instruction set, opcode POP is replaced with BL xxxxx, where xxxxx is the relative offset from the current frame pointer to the address of the protection functionality. For cases where there is a complex instruction set, where the return opcodes can have different sizes, e.g. 16 or 32 bits, the return opcode is replaced with an invocation of a dedicated software interrupt which jumps to the predefined protection functionality. In one embodiment, each respective predetermined instruction comprises a respective trampoline to the associated protection module.

Information regarding the replaced opcodes is stored in the associated protection module. Particularly, the position of the replaced opcode within the code is saved, thereby allowing the protection module to know which opcode to perform if the call stack is valid, as will be described below. Additionally, saving the position of the replaced opcode will allow the protection module to know which parameters should be analyzed. Furthermore, in one embodiment, the replaced opcode is copied into the protection module, such that once authorized, the respective opcode can be executed, as will be described below.

In optional stage 1035, processor 40 further inserts an indication within the header of the adjusted file indicating that the file was adjusted. In stage 1040, processor 40 of server 20 further generates at least one process protection manager, each generated process protection manager associated with a respective one of the received files of stage 1000. Each generated process protection manager is implemented as a shared object, as described above in relation to the generated protection modules of stage 1010. In one embodiment, as illustrated in FIG. 1E, a respective process protection manager is generated for a set of received files that are to be loaded into the same process. In another embodiment, a plurality of process protection managers are generated, each associated with a respective set of files that are to be loaded into a respective process. In another embodiment, a generated process protection manager is associated with files that are to be loaded into a plurality of processes, as will be described below. In one embodiment, each generated protection module of stage 1010 comprises one or more instructions to branch to a process protection manager within the respective process, as will be described below. As will further be described below, each generated process protection manager is arranged to compare flows originating from associated ELF files and shared objects to the allowable flow models in the respective protection modules.

In optional stage 1045, processor 40 adds to each adjusted ELF file a dependency for the respective process protection manager. In stage 1050, communication module 60 of server 20 outputs to user terminal 100: the adjusted file, or files; and the generated one or more protection modules and process protection managers. In one example, illustrated in FIG. 1C, a single ELF file, denoted TEST.ELF, is received by server 20. Server 20 replaces certain opcodes within TEST.ELF, as described above, the adjusted file denoted TEST_PATCHED.ELF. As further described above, server 20 generates a respective protection module associated with TEST_PATCHED.ELF, implemented as a shared object, the generated protection module denoted TEST_PROTECTOR.SO. Additionally, as further described above, server 20 generates a respective process protection manager, implemented as a shared object, the generated process protection manager denoted PROTECTOR_PW.SO. Server 20 transmits TEST_PATCHED.ELF, TEST_PROTECTOR.SO and PROTECTOR_PW.SO to user terminal 100.

In another example, illustrated in FIG. 1D, a single shared object file, denoted HELPER.SO, is received by server 20. Server 20 replaces certain opcodes within HELPER.SO, as described above, the adjusted file denoted HELPER_PATCHED.SO. As further described above, server 20 generates a respective protection module associated with HELPER_PATCHED.ELF, implemented as a shared object, the generated protection module denoted HELPER_PROTECTOR.SO. Additionally, as further described above, server 20 generates a respective process protection manager, implemented as a shared object, the generated process protection manager denoted PROTECTOR_PW.SO. Server 20 transmits HELPER_PATCHED.ELF, HELPER_PROTECTOR.SO and PROTECTOR_PW.SO to user terminal 100.

In another example, illustrated in FIG. 1E, server 20 receives both TEST.ELF and HELPER.ELF. Server 20 then generates and outputs: TEST_PATCHED.ELF; TEST_PROTECTOR.SO; HELPER_PATCHED.ELF; HELPER_PROTECTOR.SO; and PROTECTOR_PW.SO. As illustrated, a single process protection manager is generated for use in a respective process where TEST_PATCHED.ELF, HELPER_PATCHED.ELF, TEST_PROTECTOR.SO and HELPER_PROTECTOR.SO are loaded therein. Thus, the user can decide which files are to be protected and it is not necessary to generate a process protection manager which protects all the files in a process.

Figure 2A:
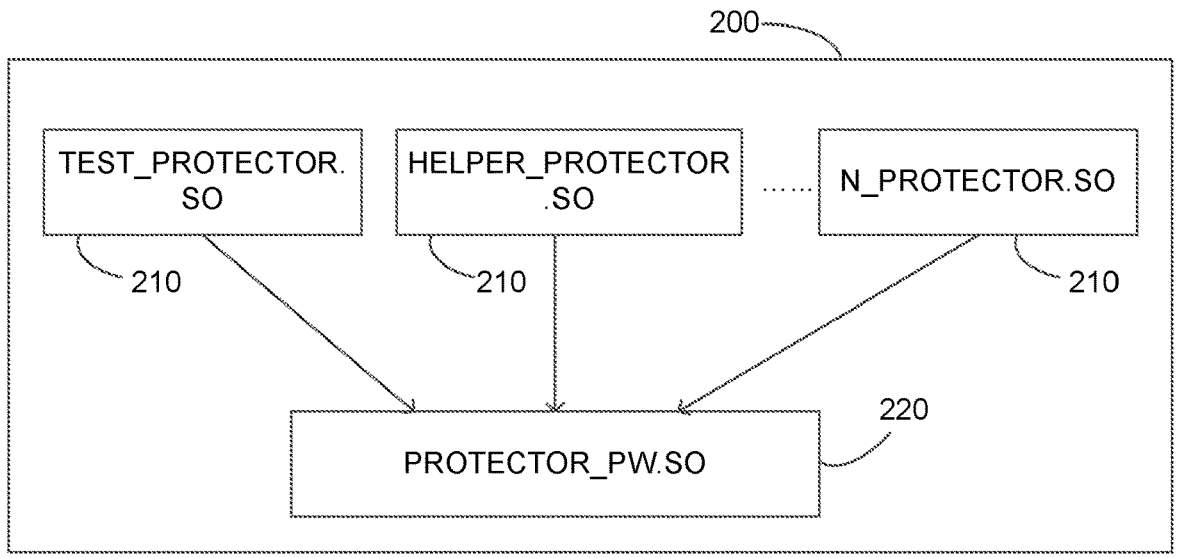
FIG. 2A illustrates a high level block diagram of a CFI system, in accordance with certain embodiment.

FIG. 2A illustrates a high level block diagram of a CFI system 200, in accordance with certain embodiments. CFI system 200 comprises: a plurality of protection modules 210; and a process protection manager 220. Each of the plurality of protection modules 210 and process protection manager 220 is implemented as a shared object, as described above. Additionally, each of the plurality of protection modules 210 and process protection manager 220 is loaded into a process. Each protection module 210 comprises a respective allowable flow model associated with at least one of a plurality of portions of the process. In one embodiment, the allowable flow model of each protection module 210 is stored as read only data, and can therefore not be modified by an attacker. In one further embodiment, the entirety of the code of each protection module 210 is stored as read only data.

Figure 2B:
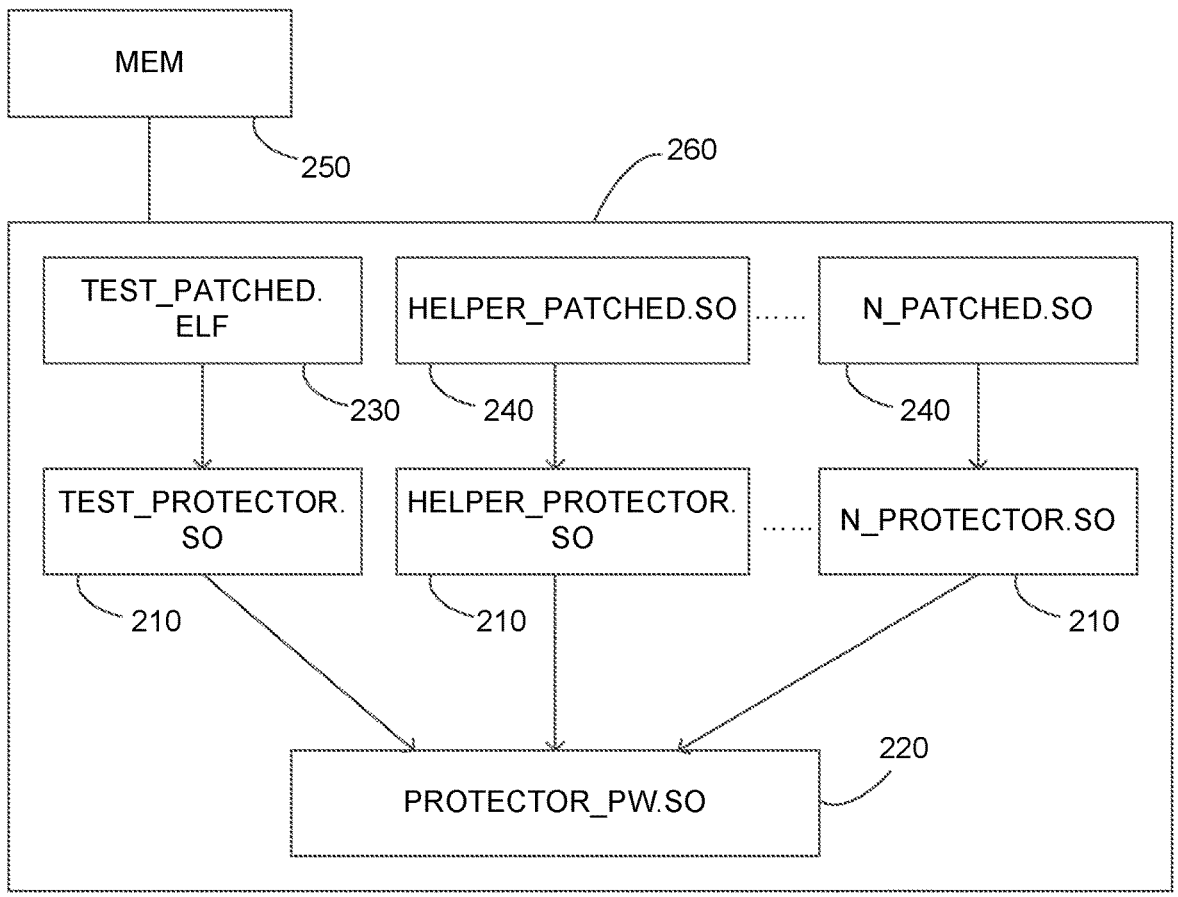
FIG. 2B illustrates a high level block diagram of a process, utilizing the CFI system of FIG. 2A.

FIG. 2B illustrates a high level block diagram of the originating files for the code of the process, including: a dynamically linked ELF file 230; a plurality of shared objects 240; protection modules 210 and process protection manager 220. FIGS. 2A-2B are described together. ELF file 230 is executed and shared objects 240, protection modules 210 and process protection manager 220 are loaded into the process. Thus, each protection module 210 is associated with a respective portion of the process which originated from ELF file 230 or a shared object 240, as described above. ELF file 230, shared objects 240, protection modules 210 and process protection manager 220 are each stored in a respective area of a memory 250. Additionally, the process is run by a processor 260, processor 260 associated with memory 250, i.e. CFI system 200 is run by processor 260.

FIG. 2C illustrates a high level flow chart of a method of operation of CFI system 200, in accordance with certain embodiments. In stage 2000, during execution of ELF file 230, process protection manager 220 is loaded into the process. In one preferred embodiment, process protection manager 220 is loaded into the process before any other shared objects, such as protection modules 210. In an embodiment where ELF file 230 contains a dependency for process protection manager 220, process protection manager 220 is loaded automatically. In an embodiment where ELF file 230 does not contain a dependency for process protection manager 220, process protection manager 220 will not be loaded automatically. In one embodiment, the LD_PRELOAD command is set with the path of process protection manager 220 as part of a dynamic-link library (DLL) injection.

In one embodiment, a plurality of process protection managers 220 are provided, each process protection manager 220 exhibiting a respective predetermined comparison rule. Particularly, as will be described below, process protection manager 220 compares respective parameters of certain control flow instructions with respective allowable flow models. In one embodiment, the comparison is performed in accordance with the respective predetermined comparison rule. For example, each predetermined comparison rule can in one embodiment indicate the level of determinism of the comparison. Particularly, in one embodiment, certain allowable flow models are not 100% deterministic, and there may be cases where parameters of the control flow instruction does not meet the respective parameters of the allowable flow model, however it is not necessarily an anomaly, because the allowable flow model is true for most cases, but not all. Additionally, certain allowable flow models are 100% deterministic and any control flow instruction that does not meet the respective parameters of the allowable flow model is considered an anomaly. Furthermore, there is in one embodiment a plurality of types of allowable flow models, each with a different level of determinism. The predetermined comparison rule of the respective process protection manager 220 is indicative of what level of determinism is used for the current process, i.e. which allowable flow models are used.

In one embodiment, the respective process protection manager 220 is loaded responsive to a predetermined feature of the process. In one further embodiment, the predetermined feature of the process is the criticality of the process. For example, for a critical process, such as a braking system in an automobile, the process protection manager 220 loaded is one that exhibits a predetermined comparison rule that utilizes only 100% deterministic allowable flow models, because false positive anomaly detection is not acceptable in such a critical process. For a less critical process, the process protection manager 200 loaded is one that exhibits a predetermined comparison rule that utilizes less than 100% deterministic allowable flow models, thereby allowing false positives but reducing the number of false negatives.

In one example, ISO 26262, "Road vehicles—Functional safety", is an international standard for functional safety of electrical and/or electronic systems in production automobiles defined by the International Organization for Standardization (ISO) in 2011. According to this standard there are different safety levels:
  1. QM—Quality management—no safety requirements; and
  2. ASIL A-D: safety level where ASIL D is the maximum level.

Thus, as described above, for different safety levels, different process protection managers 220 are used.

In one embodiment, a plurality of process protection managers 220 are provided, each process protection manager 220 generating a different predetermined signal. Particularly, as will be described below, responsive to the detection of an anomaly, i.e. when the respective parameters of a control flow instruction does not meet the respective parameters of the associated allowable flow model, the respective process protection manager 220 loaded into the process generates a predetermined signal. As will be further described below, in one embodiment the generated predetermined signal comprises an anomaly notification. In another embodiment, the generated predetermined signal comprises, alternatively or additionally, an indication whether the respective control flow instruction can be performed. In one further embodiment, as described above, the respective process protection manager 220 is loaded responsive to a predetermined feature of the process, optionally the criticality of the process. For example, for a critical process, the process protection manager 220 loaded is one that the generated signal does not exhibit an indication whether the control flow instruction can be performed. Since it is a critical process, anomaly reports are generated, but not acted upon by CFI system 200, so as not to inadvertently cause a failure in the critical process. For a less critical process, the process protection manager 200 loaded is one that the generated signal does exhibit and indication whether the control flow instruction can be performed.

In stage 2010, protection modules 210 are loaded into the process. In one embodiment, process protection manager 220 determines which protection modules 210 need to be loaded into the process. Particularly, as described above, each protection module 210 is a shared object. Therefore, it isn't necessary to provide each file with a unique protection module 210, and a single protection module 210 can be associated with a plurality of ELF files 230 or shared object files 240. Protection module 210 analyzes the executed ELF file 230 and shared object files 240 that are loaded into the process to identify whether the respective file exhibits a predetermined indication. As described above, in one embodiment, any file which is patched, i.e. where opcodes are replaced, exhibits an indication of such in the header of the respective file. For each file that exhibits a respective predetermined indication, process protection manager 220 loads the respective protection module 210 associated with the respective file. In one embodiment, the respective protection modules 210 are loaded using the DLOPEN command. For each file that doesn't exhibit a respective predetermined indication, process protection manager 220 does not load the respective protection module 210 associated with the respective file.

In stage 2020, responsive to a control flow instruction in one of the plurality of portions of the process, process protection manager 220 compares one or more parameters of the control flow instruction to the allowable flow model of the respective protection module 210 associated with the respective portion of the process. As described above, certain opcodes in each of ELF file 230 and shared objects 240 were replaced with predetermined instructions which enter the respective protection module 210, thus in one embodiment the control flow instruction is an instruction that enters the respective protection module 210, as described above. As further described above, in one further embodiment, the respective protection module 210 contains an instruction to enter process protection manager 220. Thus, a section of code which was replaced above in stage 1030 goes to process protection manager 220, via the associated protection module 210. In other words, the comparison is performed responsive to a respective control flow instruction in each of the process portion and the respective protection module 210. In one further embodiment, the respective protection module 210 sends predetermined information to process protection manager 220. In one embodiment, the predetermined information comprises a pointer that points to the memory location comprising the respective allowable flow model. In another embodiment, the predetermined information comprises the respective parameters of the allowable flow model for the comparison. In one embodiment, as described above, the one or more parameters comprises: a call stack being used; a return address; a register being used; a buffer size; and/or a function flow.

In one embodiment, the respective protection module 210 exhibits a predetermined indication of which parameters process protection manager 220 is to analyze. In one further embodiment, the respective protection module 210 communicates the predetermined indication to process protection manager 220. In another further embodiment, process protection manager 220 identifies the predetermined indication within the respective protection module 210. For example, if for a particular shared object file 240 it is preferred to speed up the CFI analysis, the respective protection module 210 exhibits an indication of a reduced number of parameters to be analyzed, in comparison with other protection modules 210. Thus, the control flow in different shared object files 240, and/or ELF file 230, can be protected by different degrees, depending on the preferred level of security and the amount of time that can be spent on providing that level of security, while using a single process protection manager.

In optional stage 2030, in the event that a control flow instruction in a first of the plurality of portions of the process comprises a branch or call to an address associated with a second of the plurality of portions of the process, process protection manager 220 compares the respective parameters of the control flow instruction to the respective parameters of the allowable flow model associated with the second portion of the process. For example, if ELF file 230 comprises an instruction that branches to a function of a respective shared object file 240, process protection manager 220 compares the respective parameters of the branch instruction to the respective parameter of the allowable flow model of the respective protection module 210 associated with the respective shared object file 240, as described above.

As further described above, in one embodiment process protection manager 220 is accessed via the respective protection module 210. Thus, in the event that the control flow instruction originating from a first file is a branch or a call to code originating from a second file, the allowable flow model being used is not in the protection module 210 that connects the control flow instruction to process protection manager 220. As a result, process protection manager 220 won't know where to find the appropriate allowable flow model. Therefore, in one embodiment, in the event that process protection manager 220 does not find in the allowable flow model of the protection module 210 that branched thereto the respective parameters associated with the respective control flow instruction originating from the first file, process protection manager 220 searches the other protection modules 210 that are loaded into the process to find the appropriate allowable flow model.

Advantageously, in the case of a pointer to a function, the pointer can be verified with expected values from other shared objects. For example, in an ARM based system, where there is an instruction for "jump from register", and in the flow there is blx r3 in ELF file 230, process protection manager 220 checks if the pointer points to a known function not only in ELF file 230 but also in all protected shared objects 240.

In stage 2040, responsive to an outcome of the comparison of stage 2020 indicating that the compared one or more parameters does not meet a respective parameter of the respective allowable flow model, process protection manager 220 generates a predetermined signal. The term "does not meet a respective parameter" is meant herein that the respective parameter of the control flow instruction is not one of the allowed options in the allowable flow model. In one embodiment, the predetermined signal is a report indicative of the instruction that doesn't meet the allowable flow model. In another embodiment, the predetermined signal prevents the operation of the respective flow instruction in the respective portion of the process. In one further embodiment, process protection manager 220 further terminates the process. Preferably, a watchdog process will then restart the terminated process, as known to those skilled in the art. In one embodiment, in the event that the comparison is indicative that the compared one or more parameters meet the respective parameter of the respective allowable flow model, the operation is performed by process protection manager 220. In another embodiment, in the event that the comparison is indicative that the compared one or more parameters meet the respective parameter of the respective allowable flow model, the operation is performed by the respective protection module 210, after receiving approval from process protection manager 220. In one embodiment, as described above, the type of generated predetermined signal is dependent on a predetermined feature of the process.

Advantageously, as described above, protection modules 210 are shared objects, therefore they can be used by a plurality of shared object files. As a result, in a case where a shared object is used by more than one executable, only a single protection module 210 is necessary to protect the shared object. In contrast, if each executable needed to contain information regarding an allowable flow model of the shared object, this allowable flow model, and any other information and functions stored in protection module 210, will be duplicated for each executable, thus consuming more disk space.

Additionally, as described above, different process protection managers 220 can be selected in accordance with the type of process. Furthermore, since the protection modules 210 and process protection managers 220 are shared objects, they can be updated without having to update the entire executable. This is very advantageous in the automotive industry where performing updates is very complex.

Further advantageously, by performing a comparison with an allowable flow model that is stored as read only data, an attacker cannot modify the model to overcome the protection. This is in contrast with prior art solutions using magic cookies, stack canaries, shadow stacks, etc., which can be modified.

Figure 3A:
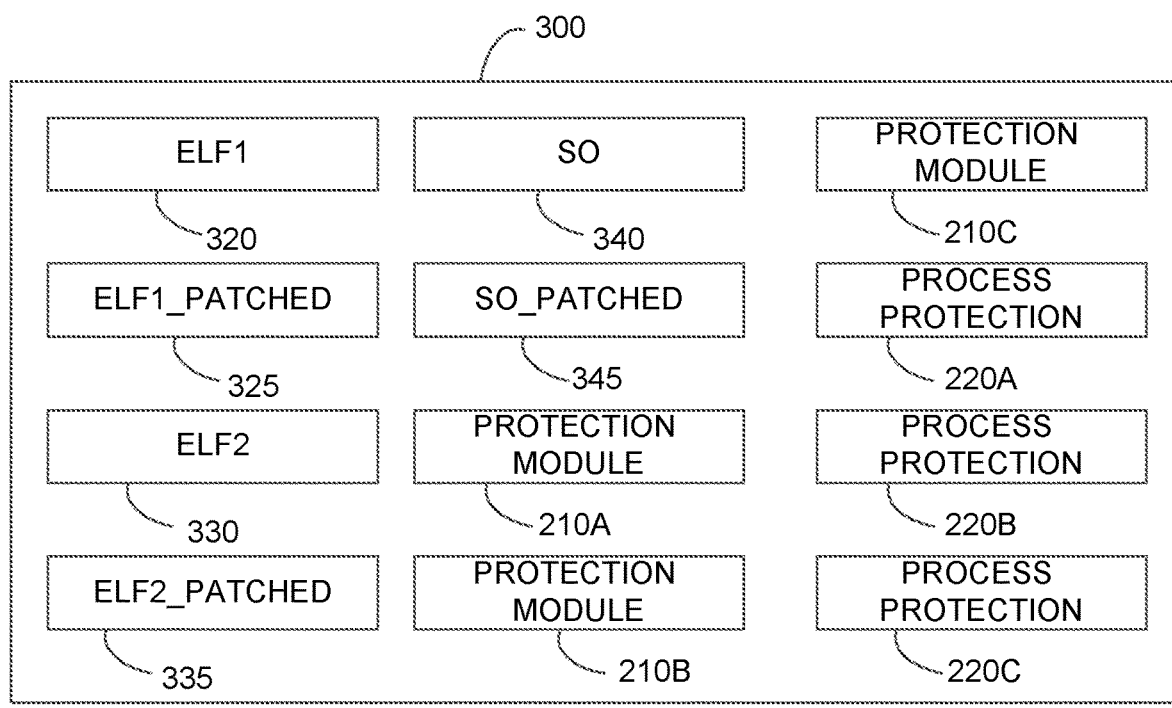

FIGS. 3A-3B illustrates an example of the use of CFI system 200. Particularly, FIG. 3A illustrates a memory 300 and FIG. 3B illustrates a processor 310 associated with memory 300. Memory 300 comprises: a first ELF file 320; a patched version 325 of ELF file 320, as described above; a protection module 210A associated with patched ELF file 325; a second ELF file 330; a patched version 335 of ELF file 330, as described above; a protection module 210B associated with patched ELF file 335; a shared object file 340; a patched version 345 of shared object file 340, as described above; a protection module 210C associated with patched shared object file 345; a first process protection manager 220A; a second process protection manager 220B; and a third process protection manager 220C.

Processor 310, illustrated in FIG. 3B, runs 4 different processes: 350A; 350B; 350C; and 350D. Each process 350 is illustrated with the originating files of each portion of the respective process 350. Specifically, a first portion of process 350A originates from patched ELF file 325, a second portion of process 350A originates from patched shared object file 345, a third portion of process 350A originates from protection module 210A, a fourth portion of process 350A originates from protection module 210C and a fifth portion of process 350A originates from process protection manager 220A.

A first portion of process 350B originates from patched ELF file 335, a second portion of process 350B originates from patched shared object file 345, a third portion of process 350B originates from protection module 210B, a fourth portion of process 350B originates from protection module 210B and a fifth portion of process 350B originates from process protection manager 220B.

A first portion of process 350C originates from ELF file 320, a second portion of process 350C originates from patched shared object file 345, a third portion of process 350C originates from protection module 210C and a fourth portion of process 350C originates from process protection manager 220C.

A first portion of process 350D originates from ELF file 330, a second portion of process 350D originates from patched shared object file 345, a third portion of process 350D originates from protection module 210C and a fourth portion of process 350D originates from process protection manager 220C.

In one example, in process 350A the user wants to apply only deterministic protection with zero level of false positive detection. Therefore, the user configures process protection manager 220A to have only deterministic security checks such as verifying that jumping in the flow is to the beginning of a function. In addition, in the case of anomaly detection, process protection manager 220A performs only reporting of the anomaly. In contrast, process 350B has a risky functionality, e.g. receives packets from a socket and parses it. In this case, the user wants to apply all security features to prevent any false negatives. Therefore, the user configures process protection manager 220B to have a plurality of security checks such as heap protection, process isolation, etc. Additionally, in the case of anomaly detection, process protection manager 220B performs reporting and mitigation, i.e. prevents the performance of the operation and/or terminates the process. In an embodiment where the process is terminated, a watchdog process will then restart the terminated process, as known to those skilled in the art.

As shown in processes 350C and 350D, the user can choose to protect only the shared library, i.e. patched shared object file 345, for example if it is provided by a 3rd party. Therefore the user executes unpatched ELF files 320 and 330, for which there will be no protection at runtime. Additionally, process protection manager 320C, which is a shared object is loaded into both processes. For each process, process protection manager 320C is loaded as LD_PRELOAD, therefore it will see that a patched shared object file 345 is loaded and it will add security by loading protection module 210C.

The above examples show the flexibility of CFI system 200 in relation to: controlling what to protect; controlling how to protect; controlling what to do in case of anomaly detection.

The above has been described in relation to an embodiment where opcodes in the ELF and shared object files are replaced with instructions to enter the respective protection modules, however this is not meant to be limiting in any way. In another embodiment, instead of replacing opcodes, code is added to each file to call the respective protection module in order to check the validity of the operation.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A control flow integrity (CFI) system comprising a processor and a memory, said processor arranged, responsive to instructions stored in said memory, to load into a process:
   at least one protection module, each of said at least one protection module comprising a respective allowable flow model associated with at least one of a plurality of portions of a process; and
   a process protection manager,
   wherein said loaded process protection manager is arranged to:
      compare one or more parameters of a control flow instruction in one of the plurality of portions of the process to said allowable flow model of said associated protection module; and
      responsive to an outcome of said comparison indicating that said compared one or more parameters does not meet a respective parameter of said respective allowable flow model, generate a predetermined signal,
   wherein each of said at least one protection module is implemented as a shared object, and
   wherein each of said at least one process protection manager is implemented as a shared object.

2. The system of claim 1, wherein said parameter comparison and signal generation of said loaded process protection manager is responsive to a control flow instruction associated with said respective protection module.

3. The system of claim 2, where said control flow instruction associated with said respective protection module comprises a predetermined branch instruction to said process protection manager.

4. The system of claim 2, wherein said parameter comparison and signal generation of said loaded process protection manager is further responsive to information sent to said loaded process protection manager responsive to said control flow instruction associated with said respective protection module.

5. The system of claim 1, wherein a control flow instruction in a first of the plurality of portions of the process comprises a branch or call to an address associated with a second of the plurality of portions of the process, said comparison being with said allowable flow model of said protection module associated with the second portion of the process,
   wherein said allowable flow model associated with the second portion of the process is not associated with the first portion of the process.

6. The system of claim 1, wherein said at least one protection module comprises a plurality of protection modules, and
   wherein, responsive to said respective parameter not being found by said process protection manager in said associated flow model, said process protection manager is further arranged to:

compare one or more parameters of the control flow instruction to an allowable flow model of another of said plurality of protection modules; and responsive to an outcome of said comparison indicating that said compared one or more parameters has not been found by said process protection manager in said respective allowable flow model, generate a predetermined signal.

7. The system of claim 1, wherein each of the plurality portions of the process is associated with a respective one of a plurality of files, wherein responsive to a first of the plurality of files exhibiting a predetermined indication, said process protection manager loads said respective protection model shared object associated with the first file.

8. The system of claim 1, wherein said process protection manager is one of a plurality of process protection managers, each exhibiting a respective predetermined rule, said comparison responsive to said respective predetermined rule of said respective process protection manager, and wherein said respective one of said plurality of process protection managers is selected responsive to a predetermined feature of the process.

9. A control flow integrity (CFI) method, the method comprising:

loading at least one protection module into a process, each of said at least one protection module comprising a respective allowable flow model associated with at least one of a plurality of portions of the process; and loading a process protection manager into the process, wherein said loaded process protection manager is arranged to:

compare one or more parameters of a control flow instruction in one of the plurality of portions of the process to said allowable flow model of said associated protection module; and responsive to an outcome of said comparison indicating that said compared one or more parameters does not meet a respective parameter of said respective allowable flow model, generate a predetermined signal, wherein each of said at least one protection module is implemented as a shared object, and wherein each of said at least one process protection manager is implemented as a shared object.

10. The method of claim 9, wherein said parameter comparison and signal generation of said loaded process protection manager is responsive to a control flow instruction associated with said respective protection module.

11. The method of claim 10, where said control flow instruction associated with said respective protection module comprises a predetermined branch instruction to said process protection manager.

12. The method of claim 10, wherein said parameter comparison and signal generation of said loaded process protection manager is further responsive to information sent to said loaded process protection manager responsive to said control flow instruction associated with said respective protection module.

13. The method of claim 9, wherein a control flow instruction in a first of the plurality of portions of the process comprises a branch or call to an address associated with a second of the plurality of portions of the process, said comparison being with said allowable flow model of said protection module associated with the second portion of the process, wherein said allowable flow model associated with the second portion of the process is not associated with the first portion of the process.

14. The method of claim 9, wherein said at least one protection module comprises a plurality of protection modules, and wherein, responsive to said respective parameter not being found by said process protection manager in said associated flow model, said process protection manager is further arranged to:

compare one or more parameters of the control flow instruction to an allowable flow model of another of said plurality of protection modules; and responsive to an outcome of said comparison indicating that said compared one or more parameters has not been found by said process protection manager in said of said respective allowable flow model, generate a predetermined signal.

15. The method of claim 9, wherein each of the plurality portions of the process is associated with a respective one of a plurality of files, wherein responsive to a first of the plurality of files exhibiting a predetermined indication, said process protection manager loads said respective protection model shared object associated with the first file.

16. The method of claim 9, wherein said process protection manager is one of a plurality of process protection managers, each exhibiting a respective predetermined rule, said comparison responsive to said respective predetermined rule of said respective process protection manager, and wherein said respective one of said plurality of process protection managers is selected responsive to a predetermined feature of the process.

17. The method of claim 9, wherein said process protection manager is one of a plurality of process protection managers, wherein said generated signal of a first of said plurality of process protection managers is arranged to prevent the operation of the respective control flow instruction and said generated signal of a second of said plurality of process protection managers is not arranged to prevent the operation of the respective control flow instruction, and wherein said respective one of said plurality of process protection managers is selected responsive to a predetermined feature of the process.

18. The method of claim 9, wherein a first of the plurality of portions of the process is associated with an executable file and a second of the plurality of portions of the process is associated with a shared object file.

19. The method of claim 9, further comprising loading the process protection manager into a plurality of processes.

20. The method of claim 9, wherein each of the at least protection module exhibits an indication of which of said parameters are used in said respective comparison.

* * * * *